US005182245A

United States Patent [19]

Arzoumanidis et al.

[11] Patent Number: 5,182,245

[45] Date of Patent: * Jan. 26, 1993

[54] OLEFIN POLYMERIZATION AND COPOLYMERIZATION CATALYST

[75] Inventors: Gregory G. Arzoumanidis, Naperville; Christine Peaches, Aurora, both of Ill.

[73] Assignee: Amoco Corporation, Chicago, Ill.

[*] Notice: The portion of the term of this patent subsequent to Jan. 29, 2008 has been disclaimed.

[21] Appl. No.: 721,158

[22] Filed: Jun. 26, 1991

[51] Int. Cl.⁵ ............................................. C08F 4/654
[52] U.S. Cl. ................................... 502/115; 502/120; 502/125; 502/126; 502/127; 526/124
[58] Field of Search ............... 502/120, 125, 126, 127, 502/115

[56] References Cited

U.S. PATENT DOCUMENTS

| 4,866,022 | 9/1989 | Arzoumanidis et al. | 502/120 |
| 4,988,656 | 1/1991 | Arzoumanidis et al. | 502/127 |
| 5,013,702 | 5/1991 | Arzoumanidis et al. | 502/120 |

*Primary Examiner*—Patrick P. Garvin
*Attorney, Agent, or Firm*—James R. Henes; William H. Magidson; Frank J. Sroka

[57] ABSTRACT

A catalyst or catalyst component for the polymerization or copolymerization of alpha-olefins in the slurry phase is formed by a process comprising forming a solution of a magnesium-containing species in a liquid and precipitating solid particles from the solution of the magnesium-containing species by treatment with a transition metal halide in the presence of at least one of a tetrabutoxysilane and a tetrabutoxytitanate.

21 Claims, No Drawings

OLEFIN POLYMERIZATION AND COPOLYMERIZATION CATALYST

BACKGROUND OF THE INVENTION

1. Field of the Invention

This invention relates to a catalyst or catalyst component that is useful for polymerizing or copolymerizing alpha-olefins and more particularly concerns a magnesium-containing supported titanium halide-based catalyst or catalyst component for polymerizing or copolymerizing alpha-olefins in the slurry phase.

2. Discussion of the Prior Art

Hydrocarbon insoluble magnesium-containing supported titanium halide-based alpha-olefin polymerization or copolymerization catalyst components or catalyst systems containing such components are now well known in the art and are described, for example, in Hoppin et al., U.S. Pat. No. 4,829,038, which is incorporated in its entirety herein by reference. Typically, these catalyst components and catalyst systems are recognized for their performance based on activity and stereospecificity. However, commercial olefin polymerization or copolymerization, especially slurry-phase alpha-olefin polymerization or copolymerization, requires additional catalyst attributes for economical large-scale operation. Specifically, the production of relatively large particle size polymers or copolymers of an alpha-olefin in a commercial slurry phase polymerization or copolymerization of an alpha-olefin often results in difficulties in suspending and conveying the polymer or copolymer particles and in limited production rate and output and are attributed to the use of relatively large particle size catalysts in the polymerization or copolymerization process. Therefore, it is highly desirable to develop catalysts and catalyst components having reduced particle sizes for use in the polymerization or copolymerization of alpha-olefins in the slurry phase.

Disadvantages of efforts to reduce the particle size of such catalysts by catalyst attrition or comminution include the expenditure of additional time and effort and the production of catalyst particles having unpredictable, irreproducible and/or nonuniform sizes. In this regard, polymer or copolymer morphology is often critical and typically depends upon catalyst morphology, and good catalyst morphology generally involves uniformity of catalyst particle size. Consequently, it is very desirable to develop a method for making catalysts or catalyst components for use in the polymerization or copolymerization of alpha-olefins which have reproducible and predictable reduced particles sizes.

Numerous individual processes or process steps have been disclosed which have as their purpose the provision of improved supported, magnesium-containing, titanium-containing, electron donor-containing olefin polymerization or copolymerization catalysts. For example, the use of carbon dioxide in preparing a magnesium-containing support has been described in the aforementioned U.S. Pat. No. 4,540,679 as a means to improve control of the morphology of the catalyst and hence of the polymer product. Also, in a different context use of carbon dioxide was described in U.S. Pat. Nos. 4,246,383; 2,244,838; 4,529,715; and 4,530,915. Treating alcoholic solutions and suspensions of alkaline earth alcoholates with carbon dioxide or sulfur dioxide was noted in Chemical Abstracts, Vol. 76, 853050v (1972). Forming a soluble magnesium species has been described in U.S. Pat. Nos. 4,315,874; 4,399,054; 4,071,674; and 4,439,540. Examples of use of silicon compounds in formation of a catalyst component include U.S. Pat. Nos. 4,071,672; 4,085,276; 4,220,554; and 4,315,835. Tetrahydrofuran (THF) has been described variously to complex a magnesium chloride species (e.g., U.S. Pat. Nos. 4,482,687, 4,277,372, 3,642,746, and 3,642,772 and in European Patent No. 131,832); as modifier in a cocatalyst (e.g., U.S. Pat. Nos. 4,158,642 and 4,148,756); and as a solvent (e.g., U.S. Pat. Nos. 4,477,639 and 4,518,706). However the specific combination of steps taught in this invention to produce a catalyst with extremely advantageous properties has not been disclosed.

Arzoumanidis et al., aforesaid U.S. Pat. No. 4,866,022 discloses a method for forming a particularly advantageous alpha-olefin polymerization or copolymerization catalyst or catalyst component that involves a specific sequence of specific individual process steps such that the resulting catalyst or catalyst component has exceptionally high activity and stereospecificity combined with very good morphology. A solid hydrocarbon-insoluble, alpha-olefin polymerization or copolymerization catalyst or catalyst component with superior activity, stereospecificity and morphology characteristics is disclosed as comprising the product formed by 1) forming a solution of a magnesium-containing species from a magnesium hydrocarbyl carbonate or magnesium carboxylate; 2) precipitating solid particles from such magnesium-containing solution by treatment with a transition metal halide and an organosilane; 3) reprecipitating such solid particles from a mixture containing a cyclic ether; and 4) treating the reprecipitated particles with a transition metal compound and an electron donor.

Arzoumanidis et al., aforesaid U.S. Pat. No. 4,540,679 disclose a process for the preparation of a magnesium hydrocarbyl carbonate by reacting a suspension of a magnesium alcoholate in an alcohol with carbon dioxide and reacting the magnesium hydrocarbyl carbonate with a transition metal component. Arzoumanidis et al., U.S. Pat. No. 4,612,299 disclose a process for the preparation of a magnesium carboxylate by reacting a solution of a hydrocarbyl magnesium compound with carbon dioxide to precipitate a magnesium carboxylate and reacting the magnesium carboxylate with a transition metal component.

Also known is incorporating an electron donor compound into the titanium-containing component as an internal modifier. An olefin polymerization system typically comprises a titanium-containing compound, an alkylaluminum compound and an electron donor external modifier compound. The electron donor external modifier used in combination with the alkyl aluminum compound and solid titanium-containing compound is distinct from the electron donor which may be incorporated as an internal modifier within the titanium-containing compound. Many classes of electron donors have been disclosed for possible use as electron donor external modifiers used during polymerization.

One class of such electron donor compounds is organosilanes. For example in U.S. Pat. No. 4,540,679, organosilanes, especially aromatic silanes, are described. Use of organosilanes as cocatalyst modifiers also is described in Published U.K. Application 2,111,066 and U.S. Pat. Nos. 4,442,276, 4,472,524, 4,478,660 and 4,522,930. Other aliphatic and aromatic silanes used in polymerization catalyst are described in U.S. Pat. Nos. 4,420,594, 4,525,555 and 4,565,798.

Hoppin et al., copending patent application Ser. No. 410,663, filed Sep. 21, 1989 and now Pat. No. 4,990,478, disclose specific branched $C_3$–$C_{10}$ alkyl-t-butoxydimethoxysilanes modifiers which not only are used in supported catalysts to provide high yield and low atactic products, but which also produce a polymer with a broader molecular weight distribution than produced using the organosilane compound selected from the group consisting of diisobutyldimethoxysilane diisopropyldimethoxysilane, di-t-butyldimethoxysilane and t-butyl-trimethoxysilane, and mixtures thereof, as described in Hoppin et al., U.S. Pat. No. 4,829,038, which as indicated hereinabove, in its entirety is specifically incorporated by reference herein.

The aforesaid Arzoumanidis et al., U.S. Pat. No. 4,866,022 also discloses organosilanes that are useful as aforesaid internal modifiers in precipitating a solid from a soluble magnesium species and that have the formula $R_nSiR^1_{4-n}$ where n is 0 to 4, R is hydrogen or an alkyl, alkoxy, haloalkyl or aryl radical containing one to about ten carbon atoms or a halosilyl radical or haloalkylsilyl radical containing one to about eight carbon atoms, and $R_1$ is OR or a halogen. The patent also discloses that aliphatic or aromatic silanes are advantageously employed as electron donor external modifiers and that preferred aliphatic silanes include isobutyltrimethoxysilane, diisobutyldimethoxysilane, diisopropyldimethoxysilane, di-t-butyldimethoxysilane, and t-butyltrimethoxysilane.

While each of the processes of the aforesaid U.S. Pat. Nos. 4,866,022; 4,540,679; and 4,612,299 affords alpha-olefin polymerization or copolymerization catalysts or catalyst components which have improved morphology and which afford polymer or copolymer products which also have improved morphology, it is highly desirable to develop alpha-olefin polymerization or copolymerization catalysts or catalyst components that have predictable and reproducible, reduced particle sizes and that afford polymers or copolymers that are more easily suspended and conveyed in the commercial polymerization or copolymerization of alpha-olefins in the slurry phase.

OBJECTS OF THE INVENTION

It is therefore a general object of the present invention to provide an improved alpha-olefin polymerization or copolymerization catalyst or catalyst component having improved morphology and an improved process for producing such catalyst or catalyst component.

More particularly, it is an object of the present invention to provide an alpha-olefin polymerization or copolymerization catalyst or catalyst component having reduced median particle size.

It is a related object of the present invention to provide an improved process for making an alpha-olefin polymerization or copolymerization catalyst having reduced median particle size.

It is a further object of the present invention to provide an improved catalyst or catalyst component for the production of a polymer or copolymer of an alpha-olefin in the slurry phase at an improved production rate or output.

Other objects and advantages of the present invention will become apparent upon reading the following detailed description and appended claims.

SUMMARY OF THE INVENTION

These objects are achieved by the solid, hydrocarbon-insoluble catalyst or catalyst component of this invention for the polymerization or copolymerization of alpha-olefins in the slurry phase, comprising a product formed by: (A) forming a solution of a magnesium-containing species in a liquid, wherein the magnesium-containing species is formed by reacting a magnesium-containing compound with carbon dioxide or sulfur dioxide; (B) precipitating solid particles from the solution of the magnesium-containing species by treatment with a transition metal halide in the presence of a tetrabutoxysilane or a tetrabutoxytitanate or both; and (C) treating the precipitated particles with a transition metal compound and an electron donor.

The aforesaid objects are also achieved by the method of this invention comprising the aforesaid steps (A), (B) and (C) to make the aforesaid catalyst or catalyst component of this invention.

DETAILED DESCRIPTION OF THE PREFERRED EMBODIMENTS

The solid, hydrocarbon-insoluble catalyst or catalyst component of this invention for the polymerization or copolymerization of alpha-olefins in the slurry phase comprises the product formed by the process of this invention, which comprises the step (A) of forming a solution of a magnesium-containing species in a liquid wherein the magnesium-containing species is formed by reacting a magnesium-containing compound with carbon dioxide or sulfur dioxide. The magnesium-containing compound from which the magnesium-containing species is formed is a magnesium alcoholate, a magnesium hydrocarbyl alcoholate, or a hydrocarbyl magnesium compound. When carbon dioxide is employed, the magnesium-containing species is a hydrocarbyl carbonate or a carboxylate. When sulfur dioxide is employed, the resulting magnesium-containing species is a sulfonate. Since the use of carbon dioxide is highly preferred, hereinafter the description is written as if carbon dioxide is used.

When a magnesium alcoholate is employed, the resulting magnesium-containing species is a magnesium hydrocarbyl carbonate. Generally, the magnesium hydrocarbyl carbonate can be prepared by reacting carbon dioxide with the magnesium alcoholate. For example, the magnesium hydrocarbyl carbonate can be formed by suspending magnesium ethoxide in ethanol, adding carbon dioxide until the magnesium ethoxide dissolves forming magnesium ethyl carbonate. If, however, the magnesium ethoxide were suspended instead in 2-ethylhexanol, at least one of magnesium 2-ethylhexyl carbonate, magnesium ethyl carbonate and magnesium ethyl/2-ethylhexyl carbonate is formed. If the magnesium ethoxide is suspended in a liquid hydrocarbon or halohydrocarbon that is free of alcohol, the addition of carbon dioxide results in the breaking apart of the magnesium ethoxide particles and the magnesium hydrocarbyl carbonate reaction product does not dissolve. The reaction of a magnesium alcoholate with carbon dioxide can be represented as follows:

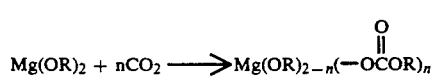

wherein n is a whole number or fraction up to 2, and wherein R is a hydrocarbyl group of 1 to 20 carbon atoms. In addition, a mixed magnesium alcoholate of the formula $Mg(OR_a)(OR_b)$ wherein $R_a$ and $R_b$ are the same or different hydrocarbyl groups of 1 to 20 carbon atoms, can be used. From the standpoint of cost and availability, magnesium alcoholates which are preferred for use according to this invention are those of the formula $Mg(OR)_2$ wherein R is as defined above. In terms of catalytic activity and stereospecificity, best results are achieved through the use of magnesium alcoholates of the formula $Mg(OR')_2$ wherein R' is an alkyl radical of 1 to about 8 carbon atoms, an aryl radical of 6 to about 12 carbon atoms or an alkaryl or aralkyl radical of 6 to about 12 carbon atoms. Best results are attained through the use of magnesium ethoxide.

Specific examples of magnesium alcoholates that are useful according to this invention include the following: $Mg(OCH_3)_2$, $Mg(OC_2H_5)_2$, $Mg(OC_4H_9)_2$, $Mg(OC_6H_5)_2$, $Mg(OC_6H_{13})_2$, $Mg(OC_9H_{19})_2$, $Mg(OC_{10}H_7)_2$, $Mg(OC_{12}H_9)_2$, $Mg(OC_{12}H_{25})_2$, $Mg(OC_{16}H_{33})_2$, $Mg(OC_{18}H_{37})_2$, $Mg(OC_{20}H_{41})_2$, $Mg(OCH_3)(OC_2H_5)$, $Mg(OCH_3)(OC_6H_{13})$, $Mg(OC_2H_5)(OC_8H_{17})$, $Mg(OC_6H_{13})(OC_{20}H_{41})$, $Mg(OC_3H_7)(OC_{10}H_7)$, $Mg(OC_2H_4Cl)_2$ and $Mg(OC_{16}H_{33})(OC_{18}H_{37})$. Mixtures of magnesium alcoholates can also be employed if desired.

A suitable magnesium hydrocarbyl alcoholate has the formula $MgR(OR')$ wherein R and R' are as defined hereinabove for the magnesium alcoholate. On the one hand, when alcohol is used as the suspending medium for the reaction between the magnesium hydrocarbyl alcoholate and carbon dioxide or sulfur dioxide, the magnesium hydrocarbyl alcoholate is a functional equivalent of the magnesium alcoholate because the magnesium hydrocarbyl alcoholate is converted to the magnesium alcoholate in alcohol. On the other hand, when the suspending medium does not contain alcohol, the magnesium hydrocarbyl alcoholate reacts with carbon dioxide as follows:

In this case,

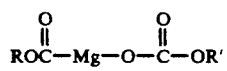

is the resulting magnesium-containing species.

When the magnesium compound from which the magnesium-containing species is formed is a hydrocarbyl magnesium compound having the formula XMgR, where X is a halogen and R is a hydrocarbyl group of 1 to 20 carbon atoms, the reaction of the hydrocarbyl magnesium compound with carbon dioxide forms a magnesium carboxylate and can be represented as follows:

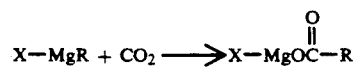

If the hydrocarbyl magnesium compound contains two hydrocarbyl groups, the reaction can be represented as follows:

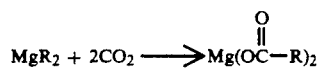

where R is as defined for X-MgR.

The hydrocarbyl magnesium compounds useful in this invention have the structure R-Mg-Q wherein Q is hydrogen, halogen or R' (each R' is independently a hydrocarbyl group of 1 to 20 carbon atoms.) Specific examples of hydrocarbyl magnesium compounds useful in this invention include: $Mg(CH_3)_2$, $Mg(C_2H_5)_2$, $Mg(C_4H_9)_2$, $Mg(C_6H_5)_2$, $Mg(C_6H_{13})_2$, $Mg(C_9H_{19})_2$, $Mg(C_{10}H_7)_2$, $Mg(C_{12}H_9)_2$, $Mg(C_{12}H_{25})_2$, $Mg(C_{16}H_{33})_2$, $Mg(C_{20}H_{41})_2$, $Mg(CH_3)(C_2H_5)$, $Mg(CH_3)(C_6H_{13})$, $Mg(C_2H_5)(C_8H_{17})$, $Mg(C_6H_{13})(C_{20}H_{41})$, $Mg(C_3H_7)(C_{10}H_7)$, $Mg(C_2H_4Cl)_2$ and $Mg(C_{16}H_{33})(C_{18}H_{37})$, $Mg(C_2H_5)(H)$, $Mg(C_2H_5)(Cl)$, $Mg(C_2H_5)(Br)$, etc. Mixtures of hydrocarbyl magnesium compounds also can be employed if desired. From the standpoint of cost and availability, dihydrocarbyl magnesium compounds preferred for use in this invention are those of the formula $MgR'_2$ wherein R' is as defined above. In terms of catalytic activity and stereospecificity, best results are achieved through the use of hydrocarbyl magnesium halide compounds of the formula MgR'Q' wherein R' is an alkyl radical of 1 to about 18 carbon atoms, an aryl radical of 6 to about 12 carbon atoms or an alkaryl or aralkyl radical of 7 to about 12 carbon atoms and Q' is chloride or bromide.

Preferably, the magnesium-containing compound is a magnesium alcoholate, and the resulting magnesium-containing species is a magnesium hydrocarbyl carbonate.

In addition, a magnesium alcoholate can be employed that is prepared by reacting magnesium metal turnings to completion with a lower molecular weight alcohol, such as methanol, ethanol, or 1-propanol, with or without a catalyst such as iodine or carbon tetrachloride, to form a solid magnesium alcoholate. Any excess alcohol is removed by filtration, evaporation or decantation. Use as the magnesium-containing compound of a magnesium alcoholate produced in this manner affords a solution of the magnesium-containing species formed from it in step A of this invention that has a substantially reduced viscosity and hence is easier to work with relative to the use of a magnesium alcoholate produced by any different known method.

Diluents or solvents suitable for use in the carbonation of the magnesium compounds to form the magnesium-containing species include alcohols containing from 1 to 18 carbon atoms, non-polar hydrocarbons and halogenated derivatives thereof, ethers and mixtures thereof that are substantially inert to the reactants employed and, preferably, are liquid at the temperatures of use. It also is contemplated to conduct the reaction at elevated pressure so that lower-boiling solvents and diluents can be used even at higher temperatures. Examples of useful solvents and diluents include alcohols such as methanol, ethanol, 1- or 2-propanol, n-butyl alcohol, t-butyl alcohol, benzyl alcohol, the amyl alcohols, cyclohexanol, 2-ethylhexanol and branched alcohols containing 9 to 12 carbon atoms; alkanes such as hexane, cyclohexane, ethylcyclohexane, heptane, octane, nonane, decane, undecane, and so forth; haloalkanes such as 1,1,2-trichloroethane carbon tetrachloride etc. aromatics such as xylenes and ethylbenzene; and halogenated and hydrogenated aromatics such as chlorobenzene, o-dichlorobenzene, tetrahydronaphthalene and decahydronaphthalene.

In somewhat greater detail, the magnesium-containing species is prepared by dissolving or suspending the magnesium-containing compound in a liquid. Approximately 10 to 80 parts by weight of the magnesium-containing compound is employed per 100 parts by weight liquid. A sufficient amount of carbon dioxide is bubbled into the liquid suspension to provide from about 0.1 to 4 moles of carbon dioxide per mole of the magnesium compound with mild stirring. Approximately 0.3 to 4 moles of $CO_2$ are added to the solution or suspension of the magnesium-containing compound with stirring at a temperature of about 0° to 100° C. over a period of approximately 10 minutes to 24 hours.

Regardless of which of the aforesaid magnesium-containing compounds is employed to form the magnesium-containing species, solid particles are next precipitated in step B from the aforesaid solution of the magnesium-containing species by treatment of the solution with a transition metal halide and additionally with a specific organosilane or organotitanate as a morphology controlling agent in order to produce a reduced median size solid catalyst or catalyst component. The transition metal halide preferably is a titanium (IV) halide and more preferably is titanium tetrachloride. The morphology controlling agent is at least one of tetrabutoxysilane and tetrabutoxytitanate. Preferably tetrabutoxysilane is employed. The tetrabutoxysilane or tetrabutorytitanate can be added as such or can be formed in situ, for example, by the exchange that takes place upon adding tetraethoxysilane or tetraethoxytitanate, with n-butyl alcohol being used as the solvent.

When the titanium metal halide and at least one of tetrabutoxysilane and tetrabutoxytitanate are combined, they undergo reaction between themselves. While the mechanism of this reaction is not entirely understood, it is known that products formed initially from this reaction, or other products formed from those initially formed products, interfere with and have an adverse effect upon the reaction between the soluble magnesium-containing species, the titanium metal halide and at least one of the tetrabutoxysilane and tetrabutoxytitanate. Therefore, it is highly preferable to minimize the extent of reaction that is allowed to take place between the titanium metal halide and the tetrabutoxysilane or tetrabutoxytitanate. This can be achieved by adding the solution formed in step A rapidly to the mixture of the titanium metal halide and at least one of tetrabutoxysilane and tetrabutoxytitanate promptly after such mixture is formed and thereby prior to the occurrence of a substantial degree of reaction between the aforesaid transition metal halide and at least one of tetrabutoxysilane and tetrabutoxytitanate. The titanium metal halide and tetrabutoxysilane or tetrabutoxytitanate are combined under rapid mixing conditions and under inert atmosphere and at a temperature in the range of from about 12° C. to about 25° C.

In this treatment of the soluble magnesium-containing species, the titanium (IV) halide component and tetrabutoxysilane component are contacted in amounts such that the atomic ratio of titanium to magnesium is from about 0.43:1, preferably from about 0.48:1, to about 0.65:1, preferably to about 0.6:1. The atomic ratio of silicon to magnesium typically can range from about 0.5:1, preferably from about 0.7:1, more preferably from about 0.9:1, to about 1.5:1, preferably to about 1.1:1, more preferably to about 1.0:1.

Broadly, in accordance with this invention, the particles precipitated in step B are next treated in step C with a transition metal compound and an electron donor. Suitable transition metal compounds which can be used for this purpose include compounds represented by the formula $T_aY_bX_{c-b}$ wherein $T_a$ is a transition metal selected from Groups IV-B, V-B and VI-B of the Periodic Table of Elements, Y is oxygen, OR' or NR'$_2$; wherein each R' is independently hydrogen or hydrocarbyl group of 1 to 20 carbon atoms; X is halogen, preferably chlorine or bromine; c has a value corresponding to the valence of the transition metal, $T_a$; b has a value of from 0 to 5 with a value of c-b being from at least 1 up to value of the valence state of the transition metal $T_a$. Suitable transition metal compounds include halide compounds of titanium, zirconium, vanadium and chromium, such as chromyl chloride, vanadium oxytrichloride, zirconium tetrachloride, vanadium tetrachloride, etc.

Titanium (IV) compounds useful in preparation of the catalyst or catalyst component of this invention are titanium halides and haloalcoholates having 1 to about 20 carbon atoms per alcoholate group such as methoxy, ethoxy, butoxy, hexoxy, phenoxy, decoxy, naphthoxy, dodecoxy and eicosoxy. Mixtures of titanium compounds can be employed if desired. Preferred titanium compounds are the halides and haloalcoholates having 1 to 8 carbon atoms per alcoholate group. Examples of such compounds include $TiCl_4$, $TiBr_4$, $Ti(OCH_3)Cl_3$, $Ti(OC_2H_5)Cl_3$, $Ti(OC_4H_9)Cl_3$, $Ti(OC_6H_5)Cl_3$, $Ti(OC_6H_{13})Br_3$, $Ti(OC_8H_{17})Cl_3$, $Ti(OCH_3)_2Br_2$, $Ti(OC_2H_5)_2Cl_2$, $Ti(OC_6H_{13})_2Cl_2$, $Ti(OC_8H_{17})Br_2$, $Ti(OCH_3)_3Br$, $Ti(OC_2H_5)_3Cl$, $Ti(OC_4H_9)_3Cl$, $Ti(OC_6H_{13})_3Br$, and $Ti(OC_8H_{17})_3Cl$. Titanium tetrahalides and particularly $TiCl_4$ are most preferred from the standpoint of attaining maximum activity and stereospecificity.

Organic electron donor useful as internal modifiers in the preparation of the stereospecific supported catalyst components of this invention are organic compounds containing oxygen, nitrogen, sulfur, and/or phosphorus. Such compounds include organic acids, organic acid anhydrides, organic acid esters, alcohols, ethers, aldehydes, ketones, amines, amine oxides, amides, thiols, various phosphorus acid esters and amides, and the like. Mixtures of organic electron donors can be employed if desired.

Specific examples of useful oxygen-containing electron donors include the organic acids and esters employed as modifiers as described above; dialkyl esters such as dimethyl, diethyl, methylethyl, dipropyl, dibutyl, dipentyl, dihexyl ethers, and so forth; alkylvinyl and alkylallyl ethers such as methyl-, ethyl-, propyl-, butyl-, pentyl-, and hexylvinyl, and hexylallyl ethers; alkaryl ethers such as anisole, phenetol, propylphenyl ether, butylphenyl ether, pentylphenyl ether, hexylphenyl ether and so forth; arylvinyl and arylallyl ethers such as phenylvinyl ether and phenylallyl ether; diaryl ethers such as diphenyl ether; and cyclic ethers such as dioxane and trioxane.

Specific examples of other suitable oxygen-containing organic electron donors include aldehydes such as propionaldehyde, butyraldehyde, valeraldehyde, caproaldehyde, and so forth, benzylaldehyde, tolualdehyde, and alpha-tolualdehyde; and ketones such as acetone, diethyl ketone, methyl ethyl ketone, dipropyl ketone, dibutyl ketone, dipentyl ketone, dihexyl ketone, and so forth, cyclobutanone, cyclopentanone, and cyclohexanone, acetophenone, propiophenone, butyrophenone, valerophenone, caprophenone, and so forth, and benzophenone.

Specific examples of useful nitrogen-containing organic electron donors include tertiary amines wherein at least one of the groups bonded to nitrogen contains at least two carbon atoms such as dimethylethylamine, methyldiethylamine, N,N'-tetramethylethylenediamine, triethylamine, tri-n-butylamine, dimethyl-n-hexylamine, diphenylmethylamine, triphenylamine, tritolylamine, diphenylbenzylamine, diphenylethylamine, diethylphenylamine, bis(diethylamino)benzenes, and the like; saturated heterocyclic amines and derivatives thereof such as pyrrolidine, piperidine, 2-methylpyrrolidine, 2-methylpiperidine, 2,5-dimethylpyrrolidine, 2,6-dimethylpiperidine, 2,4,6-trimethylpiperidine, 2,2,6,6-tetramethylpiperidine, and the like; unsaturated heterocyclic amines and derivatives thereof such as pyridine and pyrimidine, picolines, lutidines, collidines, ethylpyridines, diethylpyridines, triethylpyridines, benzylpyridines, methylpyrimidines, ethylpyrimidines, benzylpyrimidines, and the like.

Examples of useful sulfur containing organic electron donors include thioethers such as ethylthioethane, ethylthio-n-butane, and the like; and other thio analogues of the above-described oxygen-containing organic electron donors.

Specific examples of useful phosphorus-containing organic electron donors include phosphorus analogues of the above-described nitrogen-containing organic electron donors such as triethylphosphine, ethyldibutylphosphine, triphenylphosphine, and the like.

Examples of useful organic electron donors containing two or more of oxygen, nitrogen, sulfur, and phosphorus include amides such as acetamide, butyramide, caproamide, benzamide, and the like; amine oxides such as lutidine-N-oxides and collidine-N-oxides; aminoethers such as bis(2-ethoxyethyl)amine thioacids such as thioacetic acid, thiobutyric acid, thiovaleric acid, thiobenzoic acid, and the like; organosulfonic acids such as methanesulfonic acid, ethanesulfonic acid, phenylsulfonic acid, and the like; various phosphorus acid derivatives such as trimethyl phosphite, tri-n-propyl phosphite, triphenyl phosphite, tri(ethylthio)phosphite, hexamethylphosphoric triamide, and the like; and phosphine oxides such as trimethylphosphine oxide, triphenylphosphine oxide, and the like.

From the standpoint of catalyst performance and preparative ease, the organic electron donors which are preferred according to this invention are $C_1$-$C_6$ alkyl esters of aromatic carboxylic acids and halogen-, hydroxyl-, oxo-, alkyl, alkoxy-, and/or aryloxy-substituted aromatic monocarboxylic acids. Among these, the alkyl esters of benzoic, halobenzoic, phthalic, terephthalic, and isophthalic acids and of naphthalene dicarboxylic acids wherein the alkyl group contains 1 to 6 carbon atoms, such as methyl benzoate, methyl bromobenzoate, ethyl benzoate, ethyl chlorobenzoate, ethyl bromobenzoate, ethyl benzoate, ethyl chlorobenzoate, ethyl bromobenzoate, butyl benzoate, isobutyl benzoate, diisobutyl phthalate, diethyl phthalate, di-(chloroethyl)phthalate, di-n-butylphthalate, diheptylphthalate, dioctylphthalate, dihexylphthalate, hexyl benzoate, and cyclohexyl benzoate are particularly preferred. Best results are attained through the use of aromatic ortho diesters.

In step C, the particles formed in Step B, the transition metal component, and organic electron donor component are reacted at temperatures ranging from about $-10°$ C. to about $170°$ C., generally over a period of several minutes to several hours, and are contacted in amounts such that the atomic ratio of transition metal to magnesium in the particles (calculated as magnesium in magnesium compound from which the magnesium-containing species is formed) is at least about 0.5:1. Preferably, this ratio ranges from about 0.5:1 to about 20:1. Greater amounts of transition metal can be employed without adversely affecting catalyst component performance, but there typically is no need to exceed a transition metal to magnesium ratio of about 20:1 as only a portion of the transition metal is affixed to the pretreatment product during the preparative reaction. More preferably, the titanium to magnesium ratio ranges from about 2:1 to about 15:1 to ensure that the catalyst components contain sufficient titanium to exhibit good activities without being wasteful of the titanium compound employed in preparation. The electron donor component is employed in an amount ranging up from about 1.0 mole per gram atom of transition metal in the transition metal compound, and preferably from about 0.001 to about 0.6 mole per gram atom of titanium in the transition metal compound. Best results are achieved when this ratio ranges from about 0.01 to about 0.3 mole per gram atom of titanium. The atomic ratio of metal in the Group II or IIIA metal alkyl component to metal in the magnesium hydrocarbyl carbonate component ranges from about 0.001:1 to about 1:1. Preferably, this ratio ranges from about 0.005:1 to about 0.5:1 to provide the best catalyst performance.

It is preferred that the electron donor compound and transition metal compound can be contacted with the precipitated solid particles in the presence of an inert hydrocarbon or halogenated diluent, although other suitable techniques can be employed. Suitable diluents are those materials which are disclosed hereinabove as useful as diluents in steps A or B and which are substantially inert to the components employed and are liquid at the temperature employed or can be maintained in the liquid state through the use of elevated pressure.

In a highly preferred embodiment of the present invention, prior to step C, the particles precipitated in step B are reprecipitated from a solution containing a cyclic ether, and then the reprecipitated particles are treated in step C with the transition metal compound and the electron donor.

In a typical reprecipitation procedure, the particles precipitated in step B are entirely solubilized in the cyclic ether solvent and then particles are allowed to reprecipitate to form particles of uniform size. The preferable ether is tetrahydrofuran, although other suitable cyclic ethers, such as tetrahydropyran and 2-methyltetrahydrofuran, may be used, which can solubilize the particles formed in step B. Also, thioethers such as tetrahydrothiophene can be used. In some instances, such as the use of 2,2,5,5-tetrahydrofuran and tetrahydropyran-2-methanol, reprecipitation occurs upon heating to about 130°-185° F. Other compounds may be used which act in an equivalent manner, i.e., materials which can solubilize the particles formed in step B and from which solid uniform particles can be reprecipitated, such as cyclohexene oxide, cyclohexanone, ethyl acetate and phenyl acetate. Mixtures of such suitable materials may also be used.

It is highly preferred in the method of this invention to maintain the temperature of the solid-liquid mixture resulting from the precipitation in step B at a temperature in the range of from about 12° C., preferably from about 18° C., to about 25° C., preferably to about 22° C., while the cyclic ether is being combined with it. Thereafter preferably the resulting combination of the solid-liquid mixture and the cylcic ether is heated rapidly to a temperature in the range of from about 35° C., preferably from about 50° C., to about 62° C., preferably to about 57° C.

A suitable diluent that can be used in any of the aforesaid steps A, B or C or in the reprecipitation step should be substantially inert to the reactants employed and preferably is liquid at the temperature employed. It is also contemplated to conduct the particular step in question at an elevated pressure so that lower boiling diluents can be used even at higher temperatures. Typical suitable diluents are aromatic or substituted aromatic liquids, although other hydrocarbon-based liquids may be used. Aromatic hydrocarbons, such as toluene, and substituted aromatics have been found suitable. An especially suitable diluent is a halogenated aromatic such as chlorobenzene or a mixture of a halogenated aromatic such as chlorobenzene and a halogenated aliphatic such as dichloroethane. Also useful are higher boiling aliphatic liquids such as kerosine. Mixtures of diluents may be used. One useful diluent component is Isopar G which is a $C_{10}$-average isoparaffinic hydrocarbon boiling at 156°–176° C. Other examples of useful diluents include alkanes such as hexane, cyclohexane, ethylcyclohexane, heptane, octane, nonane, decane, undecane, and the like; haloalkanes such as 1,2-dichloroethane, 1,1,2-trichloroethane, carbon tetrachloride and the like; aromatics such as benzene, toluene, xylenes and ethylbenzene; and halogenated and hydrogenated aromatics such as chlorobenzene and o-dichlorobenzene.

Each of the aforesaid steps A, B and C and the aforesaid reprecipitation step is conducted in the substantial absence of water, oxygen, carbon monoxide, and other extraneous materials capable of adversely affecting the performance of the catalyst or catalyst component of this invention. Such materials are conveniently excluded by carrying out the pretreatment in the presence of an enert gas such as nitrogen or argon, or by other suitable means. Optionally, all or part of the process can be conducted in the presence of one or more alpha-olefins which, when introduced into the preparative system in gaseous form, can serve to exclude catalyst poisons. The presence of one or more alpha-olefins also can result in improved stereospecificity. Useful alpha-olefins include ethylene, propylene, butene-1, pentene-1, 4-methylpentene-1, hexene-1, and mixtures thereof. Of course, any alpha-olefin employed should be of relatively high purity, for example, polymerization grade or higher. Other precautions which aid in excluding extraneous poisons include purification of any diluent to be employed, such as by percolation through molecular sieves and/or silica gel prior to use, and drying and/or heating of reactant.

As a result of the above-described preparation there is obtained from step C a solid reaction product suitable for use as a catalyst or catalyst component. Prior to such use, it is desirable to remove incompletely-reacted starting materials from the solid reaction product from step C. This is conveniently accomplished by washing the solid from step C, after separation from any preparative diluent, with a suitable solvent, such as a liquid hydrocarbon or chlorocarbon, preferably within a short time after completion of the preparative reaction because prolonged contact between the catalyst component and unreacted starting materials may adversely affect catalyst component performance.

Although not required, the solid reaction product prepared from step C may be contacted with at least one liquid Lewis acid prior to polymerization. Such Lewis acids useful according to this invention are materials which are liquid at treatment temperatures and have a Lewis acidity high enough to remove impurities such as unreacted starting materials and poorly affixed compounds from the surface of the solid reaction product from step C. Preferred Lewis acids include halides of Group III-V metals which are in the liquid state at temperatures up to about 170° C. Specific examples of such materials include $BCl_3$, $AlBr_3$, $TiCl_4$, $TiBr_4$, $SiCl_4$, $GeCl_4$, $SnCl_4$, $PCl_3$ and $SbCl_5$. Preferable Lewis acids are $TiCl_4$ and $SiCl_4$. Mixture of Lewis acids can be employed if desired. Such Lewis acid may be used in a compatible diluent.

Although not required, the solid reaction product from step C may be washed with an inert liquid hydrocarbon or halogenated hydrocarbon before contact with a Lewis acid. If such a wash is conducted, it is preferred to substantially remove the inert liquid prior to contacting the washed solid with Lewis acid.

Although the chemical structure of the catalyst or catalyst components of this invention is not known precisely, the components generally comprise from about 1 to about 6 wt. % titanium, from about 10 to about 25 wt. % magnesium, and from about 45 to about 65 wt. % halogen. Preferably, the catalyst component of this invention comprise from about 2.0 to about 4 wt. % titanium, from about 15 to about 21 wt. % magnesium and from about 55 to about 65 wt. % chlorine.

Prepolymerization and encapsulation of the catalyst or catalyst component of this invention can also be carried out prior to being used in the polymerization or copolymerization of alpha olefins.

In general, it is highly preferred that the catalyst or catalyst component of this invention is prepolymerized with an alpha-olefin before use as a polymerization or copolymerization catalyst or catalyst component. In prepolymerization, catalyst or catalyst components of this invention is preferably prepolymerized with an alpha-olefin before use as a polymerization or copolymerization catalyst or catalyst component. In prepolymerization, catalyst or catalyst component and an organoaluminum compound cocatalyst such as triethylaluminum are contacted with an alpha-olefin such as propylene under polymerization conditions, preferably in the presence of a modifier such as a silane and in an inert hydrocarbon such as hexane. Typically, the polymer/catalyst or catalyst component weight ratio of the resulting prepolymerized component is about 0.1:1 to about 20:1. Prepolymerization forms a coat of polymer around catalyst or catalyst component particles which in many instances improves particle morphology, activity, stereospecificity, and attrition resistance. A particularly useful prepolymerization is described in U.S. Pat. No. 4,579,836, which in its entirety is specifically incorporated herein by reference.

Typically, the catalyst or catalyst component of this invention is employed in conjunction with a cocatalyst component including a Group II or III metal alkyl and, typically, one or more external modifier compounds. Useful Group II and IIIA metal alkyls are compounds of the formula $MR_m$ wherein M is a Group II or IIIA metal, each R is independently an alkyl radical of 1 to about 20 carbon atoms, and m corresponds to the valence of M. Examples of useful metals, M, include magnesium, calcium, zinc, cadmium, aluminum, and gallium. Examples of suitable alkyl radicals, R, include methyl, ethyl, tutyl, hexyl, decyl, tetradecyl, and eicosyl. From the standpoint of catalyst component performance, preferred Group II and IIIA metal alkyls are those or magnesium, zinc, and aluminum wherein the alkyl radicals contain 1 to about 12 carbon atoms. Specific examples of such compounds include $Mg(CH_3)_2$, $Mg(C_2H_5)_2$, $Mg(C_2H_5)(C_4H_9)$, $Mg(C_4H_9)_2$, $Mg(C_6H_{13})_2$, $Mg(C_{12}H_{25})_2$, $Zn(CH_3)_2$, $Zn(C_2H_5)_2$, $Zn(C_4H_9)_2$, $Zn(C_4H_9)(C_8H_{17})$, $Zn(C_6H_{13})_2$, $Zn(C_6H_{13})_3$, and $Al(C_{12}H_{25})_3$. More preferably a magnesium, zinc, or aluminum alkyl containing 1 to about 6 carbon atoms per alkyl radical is used. Best results are achieved through the use of trialkylaluminums containing 1 to about 6 carbon atoms per alkyl radical, and particularly triethylaluminum and triisobutylaluminum or a combination thereof.

If desired, metal alkyls having one or more halogen or hydride groups can be employed, such as ethylaluminum dichloride, diethylaluminum chloride, ethylaluminum sesquichloride, diisobutylaluminum hydride, and the like.

A typical catalyst system for the polymerization or copolymerization of alpha olefins is formed by combining the supported titanium-containing catalyst or catalyst component of this invention and an alkyl aluminum compound, together with modifiers including an electron donor and, preferably, a silane. Typically, useful aluminum-to-titanium atomic ratios in such catalyst systems are about 10 to about 500 and preferably about 30 to about 300. Typical aluminum compound-to-electron donor molar ratios in such catalyst systems are about 5 to about 40. Typical aluminum-to-silane compound molar ratios in such catalyst systems are about 8 to about 30.

To maximize the activity and sterospecificity of this cocatalyst system, it is preferred to incorporate one or more external modifiers, typically electron donors, and including compounds such as silanes, organic acids, organic acid esters and mixtures thereof.

Organic electron donors that are useful as external modifiers of the aforesaid cocatalyst system are organic compounds containing oxygen, silcon, nitrogen, sulfur, and/or phosphorus. Such compounds include organic acids, organic acid anhydrides, organic acid esters, alcohols, ethers, aldehydes, ketones, silanes, amines, amine oxides, amides, thiols, various phosphorus acid esters and amides, and the like. Mixtures of organic electron donors can also be employed.

Preferred organic acids and esters are benzoic acid, halobenzoic acids, phthalic acid, isophthalic acid, terephthalic acid, and the alkyl esters thereof wherein the alkyl group contains 1 to 6 carbon atoms such as methyl chlorobenzoates, butyl benzoate, isobutyl benzoate, methyl anisate, ethyl anisate, methyl p-toluate, hexylbenzoate, and cyclohexyl benzoate, and diisobutyl phthalate as these give good results in terms of activity and stereospecificity and are convenient to use.

The aforesaid cocatalyst system advantageously contains an aliphatic or aromatic silane as the external modifier. Preferable silanes useful in the aforesaid cocatalyst system include alkyl-, aryl-, and/or alkoxy-substituted silanes containing hydrocarbon moieties with 1 to about 20 carbon atoms. Especially preferred are silanes having a formula: $SiR_4$, wherein R is independently R' or OR' with R' having 1 to about 20 carbon atoms. Preferred aliphatic silanes include isobutyltrimethoxysilane, diisobutyldimethoxysilane, diisopropyldi-methoxysilane, di-t-butyldimethoxysilane, t-butyltrimethoxysilane, cyclohexylmethyldimethoxysilane, dicyclohexyldimethoxysilane, and 6-triethoxysilyl-2-norbonene.

The catalyst or catalyst component of this invention is useful in polymerization or copolymerization of alpha-olefins such as ethylene and propylene, and are most useful in stereospecific polymerization or copolymerization of alpha-olefins containing 3 or more carbon atoms such as propylene, butene-1, pentene-1, 4-methylpentene-1, and hexene-1, as well as mixtures thereof and mixtures thereof with ethylene. The catalyst or catalyst component of this invention is particularly effective in the stereospecific polymerization or copolymerization of propylene or mixtures thereof with up to about 20 mole % ethylene or a higher alpha-olefin. According to the invention, highly crystalline polyalpha-olefins are prepared by contacting at least one alpha-olefin with the above-described catalyst or catalyst component of this invention under polymerization or copolymerization conditions. Such conditions include polymerization or copolymerization temperature and time, pressure(s) of the monomer(s), avoidance of contamination of catalyst, choice of polymerization or copolymerization medium in slurry processes, the use of additives to control polymer or copolymer molecular weights, and other conditions well known to persons of skill in the art. Slurry- and bulk-phase polymerization or copolymerization processes are contemplated herein.

The amount of the catalyst or catalyst component of this invention to be employed varies depending on choice of polymerization or copolymerization technique, reactor size, monomer to be polymerized or copolymerized, and other factors known to persons of skill in the art, and can be determined on the basis of the examples appearing hereinafter. Typically, a catalyst or catalyst component of this invention is used in amounts ranging from about 0.005 to about 0.2 grams of catalyst per gram of polymer or copolymer produced.

Irrespective of the polymerization or copolymerization process employed, polymerization or copolymerization should be carried out at temperatures sufficiently high to ensure reasonable polymerization or copolymerization rates and avoid unduly long reactor residence times, but not so high as to result in the production of unreasonably high levels of stereorandom products due to excessively rapid polymerization or copolymerization rates. Generally, temperatures range from about 0° to about 120° C. with about 20° C. to about 95° C. being preferred from the standpoint of attaining good catalyst performance and high production rates. More preferably, polymerization according to this invention is carried out at temperatures ranging from about 50° C. to about 80° C.

Alpha-olefin polymerization or copolymerization according to this invention is carried out at monomer pressures of about atmospheric or above. Generally, monomer pressures range from about 20 to about 600 psi.

The polymerization or copolymerization time will generally range from about ½ to several hours in batch processes with corresponding average residence times in continuous processes. Polymerization or copolymerization times ranging from about 1 to about 4 hours are typical in autoclave-type reactions. In slurry processes, the polymerization or copolymerization time can be regulated as desired. Polymerization or copolymerization times ranging from about ½ to several hours are generally sufficient in continuous slurry processes.

Diluents suitable for use in slurry polymerization or copolymerization processes include alkanes and cycloalkanes such as pentane, hexane, heptane, n-octane, isooctane, cyclohexane, and methylcyclohexane; alkylaromatics such as toluene, xylene, ethylbenzene, isopropylbenzene, ethyl toluene, n-propyl-benzene, diethylbenzenes, and mono- and dialkylnaphthalenes; halogenated and hydrogenated aromatics such as chlorobenzene. Chloronaphthalene, ortho-dichlorobenzene, tetrahydronaphthalene, decahydronaphthalene; high molecular weight liquid paraffins or mixtures thereof, and other well-known diluents. It often is desirable to purify the polymerization or copolymerization medium prior to use, such as by distillation, percolation through molecular sieves, contacting with a compound such as an alkylaluminum compound capable of removing trace impurities, or by other suitable means.

Irrespective of polymerization or copolymerization technique, polymerization or copolymerization is carried out under conditions that exclude oxygen, water, and other materials that act as catalyst poisons. Also, according to this invention, polymerization or copolymerization can be carried out in the presence of additives to control polymer or copolymer molecular weights. Hydrogen is typically employed for this purpose in a manner well known to persons of skill in the art. Although not usually required, upon completion of polymerization or copolymerization, or when it is desired to terminate polymerization or copolymerization or at least temporarily deactivate the catalyst or catalyst component of this invention, the catalyst can be contacted with water, alcohols, acetone, or other suitable catalyst deactivators in a manner known to persons of skill in the art.

The products produced in accordance with the process of this invention are normally solid, predominantly isotactic polyalpha-olefins. Polymer or copolymer yields are sufficiently high relative to the amount of catalyst employed so that useful products can be obtained without separation of catalyst residues. Further, levels of stereorandom by-products are sufficiently low so that useful products can be obtained without separation thereof. The polymeric or copolymeric products produced in the presence of the invented catalyst can be fabricated into useful articles by extrusion, injection molding, and other common techniques.

The invention described herein is illustrated, but not limited, by the following examples.

EXAMPLE 1

Step A-Formation of Magnesium Alkyl Carbonate Solution

Into a two-liter reactor, equipped with a mechanical stirrer and flushed with dry nitrogen, was transferred a mixture of 153 grams of magnesium ethoxide, 276 milliliters of 2-ethyl-1-hexanol and 1100 milliliters of toluene. This mixture was agitated at 450 rpm under 30 psig of carbon dioxide and heated at 93° C. for three hours. The resulting solution was transferred to a two-liter bottle. The total volume of this solution was 1530 milliliters. The solution contained 0.10 gram-equivalents of magnesium ethoxide per milliliter.

Step B-Formation of Solid Particles

Into a 1.6-liter reactor was charged rapidly 300 milliliters of toluene, 40 milliliters of tetra-n-butoxysilane, 29.1 milliliters of titanium tetrachloride under a blanket of dry nitrogen, with agitation at 300 rpm at 20° C., followed promptly (within 3-5 minutes) by the rapid admixture thereinto of a mixture of 171 milliliters of the Step A magnesium hydrocarbyl carbonate solution. Solid particles precipitated.

Step B$^1$-Reprecipitation

After the mixture containing the precipitate was agitated and cooled to 16° C., at which temperature 75 milliliters of tetrahydrofuran (THF) were added rapidly (within about one minute), whereupon the solids dissolved completely. The temperature in the reactor was increased to 54° C.±3° C. within 15 minutes. Within about 10 minutes after the THF addition, solids began to reprecipitate from solution, and solid formation was complete within 5 minutes. Stirring was continued for 1 hour at 54° C.±3° C., after which agitation was stopped and the resulting solid was allowed to settle. Under a nitrogen atmosphere, supernatant at 38°-49° C. was decanted, and the solid was washed three times with 75-milliliters portions of toluene.

Step C - Titanium (IV) Compound Treatment

To the solid from Step B$^1$ in the one-liter reactor were added 188 milliliters of toluene and 75 milliliters of titanium tetrachloride. The resulting mixture was heated to 113°±3° C. within 30 minutes and stirred at 400 rpm at that temperature for one hour. After stirring was stopped, the resulting solid was allowed to settle and the supernatant was decanted. After 225 milliliters of toluene, 75 milliliters of titanium tetrachloride and 3.0-4.8 milliliters of di-n-butylphthalate were added to the resulting solid, the mixture was stirred at 400 rpm at 113°±3° C. for 90 minutes, the solid was allowed to settle within 5-10 minutes and supernatant liquid was decanted. After 143 milliliters of toluene were added, the mixture was heated to 91° C. for 30 minutes. After the agitation was stopped, the solid was allowed to settle and the supernatant decanted. An additional 188 milliliters of titanium tetrachloride was added, the mixture heated at 91° C. under agitation for 30 minutes, after which the agitation was stopped, and the supernatant liquid was decanted. The residue washed five times with 75 milliliter portions of hexane, transferred to a drybox as a hexane suspension, filtered and dried for 3-5 minutes.

The particle size distribution of the catalyst was measured using a laser diffraction particle size analyzer (Shimadzu Model SALD-1100) and found to have a particle size distribution (PSD) of $d_{10}$ of 2.3 microns, $d_{50}$ of 7.67 microns, and $d_{90}$ of 16.53 microns. "$d_{10}$," "$d_{50}$", and "$d_{90}$" mean that 10, 50 and 90 percent, respectively, of the particles have particle sizes smaller than 2.3, 7.67 and 16.53 microns, respectively. $d_{50}$ is termed the median particle size.

A batch slurry phase polymerization of propylene gave a polymer yield of 25.7 kilograms of polypropylene per gram of magnesium in the catalyst, with 0.6% solubles, 1.4% extractables and 26.1 lbs/ft$^3$ bulk density (BD). The batch slurry phase propylene polymerization evaluation was performed in a 2 liter reactor at 71° C. at 150 pounds per square inch gauge including 12.2 millimoles of hydrogen, with stirring at 500 revolutions per minute with a reaction time of 2 hours. Triethylaluminum (TEA) was used as a cocatalyst together with diisobutyldimethoxysilane as an external modifier. The reactor was charged with TEA/modifier, titanium component, hydrogen, and propylene in that order. "Yield" (kilograms of polymer produced per gram of solid catalyst component) was determined by magnesium analysis of the polymer product and in some cases based on the weight of solid catalyst used to polymer produced. "Solubles" were determined by evaporating the solvent from an aliquot of the filtrate to recover the amount of soluble polymer produced and are reported as the weight percent (% Sol.) of such soluble polymer based on the sum of the weights of the solid polymer separated in the filtration and the soluble polymer. "Extractables" were determined by measuring the loss in weight of a dry sample of ground polymer after being extracted in boiling n-hexane for three to six hours and are reported as the weight percent (% Ext.) of the solid polymer removed by the extraction. The viscosity of the solid polymer was measured and reported as the melt flow rate (MFR).

EXAMPLES 2-5

The procedures employed for the preparation of the solid catalyst in Example 1 were also employed to prepare solid catalysts in Examples 2-15, except as indicated hereinbelow. Each of Examples 2-4 were exact duplications of the catalyst preparation of Example 1. Each of Examples 5-15 employed the same catalyst preparation procedures employed in Example 1, except that a different internal modifier than tetra-n-butoxysilane alone and/or a different amount thereof was employed. In particular, Examples 5, 6 and 7 employed 49.5, 45 and 35 milliliters, respectively, of tetra-n-butoxysilane. Examples 8, 9 and 10 employed a mixture of (a) 20 milliliters of tetra-n-butoxysilane and 15 milliliters of tetraethoxysilane, (b) 30 milliliters of tetra-n-butoxysilane and 7 milliliters of tetraethoxysilane, or (c) 22 milliliters of tetra-n-butoxysilane and 14 milliliters of tetraethoxysilane, respectively, as the internal modifier. Example 11 employed 35 milliliters of tetra-n-butoxytitanate as the internal modifier. Example 12 employed a mixture of 20 milliliters of tetra-n-butoxysilane and 17.5 milliliters of tetrabutoxytitanate as the internal modifier. Example 13 employed a mixture of 17.5 milliliters of tetra-n-butoxysilane and 14 milliliters of tetraethoxysilane as the internal modifier.

Examples 14 and 15 are comparative examples in which 31 milliliters of tetraethoxysilane was employed as the internal modifier.

The catalysts prepared in Example 2, 3, 5, 8, 10, 11 and 14 were evaluated using the batch slurry phase polymerization evaluation procedure employed in Example 1.

The particle size distributions of the catalysts prepared in Examples 1-15 and the results of the batch slurry phase polymerization evaluations of the catalysts prepared in Examples 1, 2, 3, 5, 8, 10, 11 and 14 are presented in Table 1.

TABLE 1

| Example No. | Catalyst PSD | | | Polypropylene from Slurry Polymeriztion | | | | |
|---|---|---|---|---|---|---|---|---|
| | $d_{10}$ | $d_{50}$ | $d_{90}$ | Yield | BD | % Sol. | % Ext. | MFR |
| 1 | 2.3 | 7.67 | 16.53 | 19.386 | 26.9 | 0.7 | 0.69 | 5.6 |
| 2 | 5.3 | 12.6 | 21.9 | 17.879 | 26.1 | 0.8 | 1.52 | 3.6 |
| 3 | 2.20 | 7.69 | 17.07 | 21.210 | 23.9 | 0.5 | 1.69 | 5.1 |
| 4 | 2.83 | 9.76 | 21.48 | | | | | |
| 5 | 3.8 | 11.38 | 22.89 | 14.253 | 23.4 | 1.0 | 1.4 | 5.1 |
| 6 | 7.4[1] | 18.3[1] | 32.3[1] | | | | | |
| 7 | 2.51 | 9.79 | 23.31 | | | | | |
| 8 | 5.79 | 15.51 | 29.05 | 25.660 | 26.1 | 0.6 | 1.4 | |
| 9 | 5.25 | 13.29 | 24.04 | 14.589 | 26.2 | 1.0 | 0.71 | 9.4 |
| 10 | 5.5 | 12.4 | 20.7 | 22.231 | 25.3 | 0.7 | 1.55 | 2.34 |
| 11 | 2.9 | 10.0 | 22.2 | 21.203 | 22.6 | 1.5 | 1.59 | |
| 12 | 3.69 | 10.69 | 21.80 | | | | | |
| 13 | 5.37 | 12.56 | 21.60 | | | | | |
| 14 | 7.43 | 16.92 | 28.59 | 23.521 | 26.7 | 0.5 | 1.72 | 2.85 |
| 15 | 8.5 | 17.8 | 28.4 | | | | | |

Footnote: [1]PSD of the support only and with recrystallization from tetrahydrofuran at 21° C.

From the above description, it is apparent that the objects of the present invention have been achieved. While only certain embodiments have been set forth, alternative embodiments and various modifications will be apparent from the above description to those skilled in the art. These alternatives are considered equivalents and within the spirit and scope of the present invention.

Having described the invention, what is claimed is:

1. A solid, hydrocarbon-insoluble catalyst or catalyst component for the polymerization or copolymerization of alpha-olefins in the slurry phase, comprising a product formed by:
   A. forming a solution of a magnesium-containing species in a liquid, wherein the magnesium-containing species is formed by reacting a magnesium-containing compound with carbon dioxide or sulfur dioxide;
   B. precipitating solid particles from the solution of the magnesium-containing species by treatment with a transition metal halide in the presence of at least one of a tetrabutoxysilane and a tetrabutoxytitanate; and
   C. treating the precipitated particles with a transition metal compound and an electron donor.

2. The catalyst or catalyst component of claim 1 wherein the magnesium-containing compound in step A is reacted with carbon dioxide.

3. The catalyst or catalyst component of claim 2 wherein the aforesaid magnesium-containing compound in step A is a magnesium alcoholate.

4. The catalyst or catalyst component of claim 3 wherein the magnesium alcoholate is magnesium ethoxide.

5. The catalyst or catalyst component of claim 3 wherein the magnesium-containing species formed is a magnesium hydrocarbyl carbonate.

6. The catalyst or catalyst component of claim 3 wherein the magnesium alcoholate is formed by the reaction of magnesium metal and a lower molecular weight alcohol.

7. The catalyst or catalyst component of claim 2 wherein the aforesaid magnesium-containing compound in step A is a hydrocarbyl magnesium compound.

8. The catalyst or catalyst component of claim 7 wherein the magnesium-containing species formed is a magnesium carboxylate.

9. The catalyst or catalyst component of claim 2 wherein the transition metal component in step B is a titanium (IV) compound.

10. The catalyst or catalyst component of claim 9 wherein the transition metal component in step B is a titanium tetrachloride.

11. The catalyst or catalyst component of claim 2 wherein solid particles are precipitated in step B in the presence of a tetrabutoxysilane.

12. The catalyst or catalyst component of claim 2 wherein precipitation in step B is effected by promptly after combining the aforesaid transition metal halide and at least one of tetrabutoxysilane and tetrabutoxytitanate in a reaction vessel under rapid mixing conditions and under an inert atmosphere at a temperature in the range of from about 12° to about 25° C., rapidly charging the solution formed in step A to the resulting combination.

13. The catalyst or catalyst component of claim 12 wherein the solution formed in step A is charged to the aforesaid resulting combination prior to the occurrence of a substantial degree of reaction between the aforesaid transition metal halide and at least one of tetrabutoxysilane and tetrabutoxytitanate.

14. The catalyst or catalyst component of claim 2 wherein the transition metal component in step C is a titanium tetrachloride.

15. The catalyst or catalyst component of claim 2 wherein the particles from step B are treated in step C with titanium tetrachloride and then with titanium tetrachloride in the presence of an electron donor.

16. The catalyst or catalyst component of claim 2 wherein the electron donor in step C is a dialkylphthalate ester.

17. The catalyst or catalyst component of claim 2 wherein the solid particles precipitated in step B are next dissolved and reprecipitated from a cyclic ether and then the reprecipitated particles are treated in step C with a transition metal compound and an electron donor.

18. The catalyst or catalyst component of claim 17 wherein the solidliquid mixture resulting from the precipitation in step B is maintained at a temperature in the range of from about 12° to about 25° C. while the cyclic ether is combined with it.

19. The catalyst or catalyst component of claim 18 wherein the resulting combination of the solid-liquid mixture and the cyclic ether is thereafter heated rapidly to and maintained at a temperature in the range of from about 35° C. to about 62° C. until reprecipitation is complete.

20. The catalyst or catalyst component of claim 17 wherein the cyclic ether is tetrahydrofuran.

21. The catalyst or catalyst component of claim 1 for the polymerization or copolymerization of propylene or mixtures thereof with up to 20 mole percent of ethylene.

* * * * *